(12) United States Patent
Iwazaki

(10) Patent No.: US 11,476,791 B2
(45) Date of Patent: Oct. 18, 2022

(54) MOTOR CONTROL DEVICE, MOTOR CONTROL METHOD, AND STORAGE MEDIUM

(71) Applicant: YAMADA MANUFACTURING CO., LTD., Kiryu (JP)

(72) Inventor: Takuya Iwazaki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 200 days.

(21) Appl. No.: 16/914,832

(22) Filed: Jun. 29, 2020

(65) Prior Publication Data
US 2021/0036649 A1 Feb. 4, 2021

(30) Foreign Application Priority Data
Jul. 29, 2019 (JP) .............................. JP2019-138444

(51) Int. Cl.
*H02P 29/032* (2016.01)
*H02P 27/06* (2006.01)
*H02P 29/024* (2016.01)

(52) U.S. Cl.
CPC ................................. *H02P 29/027* (2013.01)

(58) Field of Classification Search
CPC ....... H02P 29/027; H02P 27/06; H02P 29/032
See application file for complete search history.

(56) References Cited

U.S. PATENT DOCUMENTS

| 4,680,930 A * | 7/1987 | Dollison .................... F03C 1/10 |
| | | 60/369 |
| 10,199,974 B2 * | 2/2019 | Yoshiya .................. H02P 27/06 |
| 2015/0365024 A1 * | 12/2015 | Myoen .................. H02P 29/027 |
| | | 318/400.22 |
| 2018/0248503 A1 * | 8/2018 | Mizukami ................. H02P 6/28 |
| 2019/0181783 A1 * | 6/2019 | Narumi ..................... H02P 6/28 |

FOREIGN PATENT DOCUMENTS

| EP | 3971380 A1 * | 3/2022 |
| JP | 2007-195328 | 8/2007 |
| JP | 2015-116115 | 6/2015 |
| JP | 2018-098876 | 6/2018 |

* cited by examiner

*Primary Examiner* — Thai T Dinh
(74) *Attorney, Agent, or Firm* — Rankin, Hill & Clark LLP

(57) ABSTRACT

A motor control device includes an electric current detection result acquisition unit configured to acquire a result of detecting an electric current for operating a motor, an electric current determination unit configured to determine whether or not the electric current acquired by the electric current detection result acquisition unit is greater than or equal to a predetermined threshold value, an operation time setting unit configured to set an operation time period corresponding to the electric current when the electric current determination unit determines that the electric current is greater than or equal to the predetermined threshold value, and an operation control unit configured to perform control for causing the motor to be continuously operated for the operation time period set by the operation time setting unit.

13 Claims, 4 Drawing Sheets

MOTOR CONTROL DEVICE, MOTOR CONTROL METHOD, AND STORAGE MEDIUM

CROSS-REFERENCE TO RELATED APPLICATION

Priority is claimed on Japanese Patent Application No. 2019-138444, filed Jul. 29, 2019, the content of which is incorporated herein by reference.

BACKGROUND OF THE INVENTION

Field of the Invention

The present invention relates to a motor control device, a motor control method, and a storage medium.

Description of Related Art

A motor control device that controls a motor is known. Also, the motor may be called an electric motor.

A case in which a motor control device receives conduction heat and radiation heat from the motor and a temperature thereof exceeds an allowable temperature if no measures are taken is conceivable. For example, a case in which, when no measures are taken in a motor control device and a change in a load occurs, the temperature continues to rise and reaches a high temperature beyond that of a product guarantee is conceivable.

Thus, a function of performing overheat protection may be adopted in a motor control device. In the function of performing overheat protection, for example, the temperature of the motor control device is prevented from reaching a high temperature beyond that of the product guarantee.

In Japanese Unexamined Patent Application, First Publication No. 2007-195328 (hereinafter referred to as Patent Document 1), a motor burnout protection device that can restart driving as soon as possible after stopping motor burnout protection and is cost-effectively manufactured is disclosed (see Patent Document 1).

The motor burnout protection device described in Patent Document 1 includes an operation time detection means configured to detect a continuous output time period of an operation signal that drives and controls a motor; a number-of-operations counter configured to count the number of times the operation signal is output; an upper limit value setting unit configured to set an upper limit value of a state in which the motor has overheated to a predetermined temperature or more on the basis of the output time period and the number of times; and a burnout protection control means configured to calculate an overheat determination value based on the output time period and the number of times and output a signal for stopping the motor when the overheat determination value has reached the upper limit value (see claim 1 of Patent Document 1 and the like).

In Japanese Unexamined Patent Application, First Publication No. 2015-116115 (hereinafter referred to as Patent Document 2), a rotary electric machine integrated control device capable of determining an overheated state of a control unit without using a temperature sensor is disclosed (see Patent Document 2).

The rotary electric machine integrated control device described in Patent Document 2 includes a rotary electric machine including a stator, a rotor, and a shaft; a control unit configured to control driving of the rotary electric machine; a rotary position detection unit including a magnet and a magnetoelectric conversion element and configured to detect a rotary position of the rotor; and a magnetic shield configured to curb a process in which the magnetoelectric conversion element detects a disturbance electromagnetic field, wherein the magnetic shield is formed using a magnetic material having temperature characteristics with magnetic permeability and arranged so that the temperature changes according to the temperature of the control unit and wherein the control unit includes a determination unit configured to determine whether or not the control unit is in an overheated state on the basis of a detection signal of the magnetoelectric conversion element (see claim 1 of Patent Document 2 and the like).

In Japanese Unexamined Patent Application, First Publication No. 2018-98876 (hereinafter referred to as Patent Document 3), a motor control device that sets a power self-holding time period after stopping a driving power supply to a minimum time period in which the performance required at the time of the next activation can be secured is disclosed (see Patent Document 3).

The motor control device described in Patent Document 3 includes a drive circuit configured to drive a motor; a power-supply circuit having a power self-holding unit capable of self-holding control power after drive power to be supplied to the drive circuit is stopped; a temperature rise estimation unit configured to estimate one or more temperature rises on the basis of an electric current that flows through the motor, the drive circuit, or the power-supply circuit; a detected temperature acquisition unit configured to acquire detected temperatures of one or more protection parts and the like that are overheat protection targets; an estimated temperature calculation unit configured to add the detected temperature to a sum of the temperature rises and calculate an estimated temperature of the protection part; an electric current limit calculation unit configured to calculate an electric current limit value that limits an electric current command value on the basis of the estimated temperature; and a self-holding termination determination unit configured to determine the termination of the power self-holding. Also, in the motor control device, the temperature rise estimation unit continues the estimation of the temperature rise during the power self-holding by the power self-holding unit and the self-holding termination determination unit has an overheat protection map defining a relationship between an electric current value and a highest temperature of the protection part to which an electric current of the electric current value can be applied, sets a limit temperature corresponding to a required electric current value at the time of the next activation on the basis of the overheat protection map, and calculates a temperature obtained by adding an upper limit temperature for a performance guarantee, which is an upper limit temperature for guaranteeing output performance of the motor at the time of the next activation, to the sum of the temperature rises as an evaluated temperature. Then, in the motor control device, when evaluated temperatures of all the protection parts are below the limit temperature in the next performance determination process of comparing the evaluated temperature with the limit temperature, it is determined that a performance guarantee condition is satisfied and the power self-holding is terminated on the basis of the fact that at least the performance guarantee condition is satisfied (see claim 1 of Patent Document 3).

SUMMARY OF THE INVENTION

However, the conventional motor control devices described in Patent Documents 1 to 3 as described above still have insufficient points in terms of cost reduction and securement of a wide safe operation region.

For example, in the technology of adding a circuit such as a temperature sensor for performing overheat protection to a motor control device, the cost may be high. Also, in a motor control device, a sufficiently wide safe operation region in a configuration in which an overheated state is detected according to another technique instead of a temperature sensor for performing overheat protection may not be secured.

Aspects of the present invention have been made in consideration of such circumstances and an objective of the present invention is to provide a motor control device, a motor control method, and a storage medium capable of achieving low cost and securing a wide safe operation region.

To solve the above problem and achieve the relevant object, the present invention employs the following aspects.

<1> According to an aspect of the present invention, a motor control device is provided including: an electric current detection result acquisition unit configured to acquire a result of detecting an electric current for operating a motor; an electric current determination unit configured to determine whether or not the electric current acquired by the electric current detection result acquisition unit is greater than or equal to a predetermined threshold value (which is also referred to as an overcurrent threshold value C1 for convenience of description); an operation time setting unit configured to set an operation time period corresponding to the electric current when the electric current determination unit determines that the electric current is greater than or equal to the predetermined threshold value; and an operation control unit configured to perform control for causing the motor to be continuously operated for the operation time period set by the operation time setting unit.

According to the present aspect, in the motor control device, low cost can be achieved and a wide safe operation region can be secured.

<2> According to an aspect of the present invention, a motor control device is provided including: an electric current detection result acquisition unit configured to acquire a result of detecting an electric current for operating a motor; an electric current determination unit configured to determine whether or not the electric current acquired by the electric current detection result acquisition unit exceeds a predetermined threshold value (which is also referred to as an overcurrent threshold value D1 for convenience of description); an operation time setting unit configured to set an operation time period corresponding to the electric current when the electric current determination unit determines that the electric current exceeds the predetermined threshold value; and an operation control unit configured to perform control for causing the motor to be continuously operated for the operation time period set by the operation time setting unit.

According to the present aspect, in the motor control device, low cost can be achieved and a wide safe operation region can be secured.

Here, a configuration in which the electric current determination unit determines whether or not the electric current acquired by the electric current detection result acquisition unit is greater than or equal to a predetermined threshold value (here referred to as a threshold value E1 for convenience of description) is used as an example and a configuration in which the electric current determination unit determines whether or not the electric current acquired by the electric current detection result acquisition unit exceeds a predetermined threshold value (here referred to as a threshold value F1 for convenience of description) is used as another example.

In this case, for example, the threshold value E1 and the threshold value F1 may be different values. Also, for example, it may be possible to obtain substantially the same determination result according to both the configurations by adjusting the threshold value E1 and the threshold value F1.

Also, for example, any of a program that determines whether or not the electric current is greater than or equal to the threshold value E1 and a program that determines whether or not the electric current exceeds the threshold value F1 may be adopted if the threshold value E1 and the threshold value F1 are the same value.

<3> In the above-described aspect <1> or <2>, the electric current determination unit may make a predetermined determination with respect to the electric current acquired by the electric current detection result acquisition unit after the control is performed by the operation control unit.

In the motor control device according to the present aspect, for example, it is possible to confirm whether or not the electric current for operating the motor is less than an overcurrent threshold value C1 (or less than or equal to an overcurrent threshold value D1) without stopping the operation of the motor.

<4> In the above-described aspect <3>, the electric current determination unit determines whether or not the electric current acquired by the electric current detection result acquisition unit is greater than or equal to the electric current previously acquired by the electric current detection result acquisition unit as the predetermined determination after the control is performed by the operation control unit, and the operation control unit performs control for causing an operation of the motor to be stopped when the electric current determination unit determines that the electric current acquired by the electric current detection result acquisition unit is greater than or equal to the electric current previously acquired by the electric current detection result acquisition unit.

Also, instead of the above, the electric current determination unit may determine whether or not the electric current acquired by the electric current detection result acquisition unit exceeds the electric current previously acquired by the electric current detection result acquisition unit as the predetermined determination after the control is performed by the operation control unit. In this case, the operation control unit performs control for causing the operation of the motor to be stopped when the electric current determination unit determines that the electric current acquired by the electric current detection result acquisition unit exceeds the electric current previously acquired by the electric current detection result acquisition unit.

In the motor control device according to the present aspect, it is possible to stop the operation of the motor when a current detection result is greater than or equal to a previous detection result (or the current detection result exceeds the previous detection result) with respect to the electric current for operating the motor.

Here, a configuration in which the electric current determination unit determines whether or not the electric current acquired by the electric current detection result acquisition unit is greater than or equal to the electric current previously acquired by the electric current detection result acquisition unit (here referred to as an electric current G1 for convenience of description) is used as an example and a configuration in which the electric current determination unit determines whether or not the electric current acquired by the electric current detection result acquisition unit exceeds the electric current previously acquired by the electric current detection result acquisition unit (here referred to as an electric current H1 for convenience of description) is used as another example.

In this case, for example, the electric current G1 and the electric current H1 are the same value. However, it may be possible to obtain substantially the same determination result according to both the configurations by using a slightly deviated value instead of the electric current G1 or by using a slightly deviated value instead of the electric current H1.

Also, for example, any of a program that determines whether or not a current electric current is greater than or equal to the previous electric current G1 and a program that determines whether or not a current electric current exceeds the previous electric current H1 may be adopted if the electric current G1 and the electric current H1 are the same value.

<5> In the above-described aspect <4>, the electric current determination unit may determine whether or not the electric current acquired by the electric current detection result acquisition unit is greater than or equal to the predetermined threshold value when it is determined that the electric current acquired by the electric current detection result acquisition unit is less than the electric current previously acquired by the electric current detection result acquisition unit, the operation time setting unit may set an operation time period corresponding to the electric current when the electric current determination unit determines that the electric current is greater than or equal to the predetermined threshold value, and the operation control unit may perform control for causing the motor to be continuously operated for the operation time period set by the operation time setting unit.

Also, instead of the above, the electric current determination unit may make a subsequent determination when it is determined that the electric current acquired by the electric current detection result acquisition unit is less than or equal to the electric current previously acquired by the electric current detection result acquisition unit.

Also, instead of the above, the electric current determination unit may determine whether or not the electric current acquired by the electric current detection result acquisition unit exceeds the predetermined threshold value. In this case, the operation time setting unit sets the operation time period corresponding to the electric current when the electric current determination unit determines that the electric current exceeds the predetermined threshold value.

In the motor control device according to the present aspect, it is possible to cause the operation of the motor to be continued when the current detection result is less than the previous detection result (or the current detection result is less than or equal to the previous detection result) with respect to the electric current for operating the motor.

<6> In the above-described aspect <3>, the electric current determination unit may determine whether or not the electric current acquired by the electric current detection result acquisition unit is greater than or equal to the electric current previously acquired by the electric current detection result acquisition unit as the predetermined determination after the control is performed by the operation control unit, the operation time setting unit may set an operation time period corresponding to the electric current when the electric current determination unit determines that the electric current acquired by the electric current detection result acquisition unit is greater than or equal to the electric current previously acquired by the electric current detection result acquisition unit, and the operation control unit may perform control for causing the motor to be continuously operated for the operation time period set by the operation time setting unit.

Also, instead of the above, the electric current determination unit may determine whether or not the electric current acquired by the electric current detection result acquisition unit exceeds the electric current previously acquired by the electric current detection result acquisition unit as the predetermined determination after the control is performed by the operation control unit. In this case, the operation time setting unit sets an operation time period corresponding to the electric current when the electric current determination unit determines that the electric current acquired by the electric current detection result acquisition unit exceeds the electric current previously acquired by the electric current detection result acquisition unit and the operation control unit may perform control for causing the motor to be continuously operated for the operation time period set by the operation time setting unit.

In the motor control device according to the present aspect, it is possible to cause the operation of the motor to be continued when the current detection result is greater than or equal to the previous detection result (or the current detection result exceeds the previous detection result) with respect to the electric current for operating the motor.

<7> In any one of the above-described aspects <1> to <6>, an operation of the motor may be set as a predetermined normal operation when the electric current determination unit determines that the electric current is less than the predetermined threshold value.

Also, instead of the above, in the motor control device, an operation of the motor may be set as a predetermined normal operation when the electric current determination unit determines that the electric current is less than or equal to the predetermined threshold value.

In the motor control device according to the present aspect, it is possible to perform a normal operation when the electric current for operating the motor is less than an overcurrent threshold value C1 (or the electric current for operating the motor is less than or equal to an overcurrent threshold value D1).

<8> In any one of the above-described aspects <1> to <7>, the operation time setting unit may have a corresponding relationship between the electric current for operating the motor and the operation time period in advance and set the operation time period on the basis of the corresponding relationship.

In the motor control device according to the present aspect, for example, it is possible to use a corresponding relationship obtained in advance by experiments or the like as the corresponding relationship between the electric current for operating the motor and the operation time period.

<9> In any one of the above-described aspects <1> to <8>, the electric current determination unit may determine whether or not the electric current acquired by the electric current detection result acquisition unit is greater than or equal to a predetermined upper limit value, and the operation control unit may perform control for causing an operation of the motor to be stopped when the electric current determination unit determines that the electric current acquired by the electric current detection result acquisition unit is greater than or equal to the predetermined upper limit value.

Also, instead of the above, in the motor control device, the electric current determination unit may determine whether or not the electric current acquired by the electric current detection result acquisition unit exceeds the predetermined upper limit value. In this case, the operation control unit performs control for causing an operation of the motor to be stopped when the electric current determination unit determines that the electric current acquired by the electric current detection result acquisition unit exceeds the predetermined upper limit value.

In the motor control device according to the present aspect, it is possible to cause the operation of the motor to be stopped when the electric current for operating the motor is greater than or equal to the upper limit value (or the electric current for operating the motor exceeds the upper limit value).

Here, a configuration in which the electric current determination unit determines whether or not the electric current acquired by the electric current detection result acquisition unit exceeds the predetermined upper limit value (here referred to as an upper limit value I1 for convenience of description) is used as an example and a configuration in which the electric current determination unit determines whether or not the electric current acquired by the electric current detection result acquisition unit exceeds the predetermined upper limit value (here referred to as an upper limit value J1 for convenience of description) is used as another example.

In this case, for example, the upper limit value I1 and the upper limit value J1 are the same value. However, it may be possible to obtain substantially the same determination result according to both the configurations by using a slightly deviated value instead of the upper limit value I1 or by using a slightly deviated value instead of the upper limit value J1.

Also, for example, any of a program that determines whether or not the electric current is greater than or equal to the upper limit value I1 and a program that determines whether or not the electric current exceeds the upper limit value J1 may be adopted if the upper limit value I1 and the upper limit value J1 are the same value.

<10> In the above-described aspect <9>, a value which is a margin less than an allowed maximum value of the electric current may be set as the predetermined upper limit value.

In the motor control device according to the present aspect, because the upper limit is set in consideration of the margin, it is possible to reliably prevent a problem from occurring in the motor due to a high electric current.

<11> According to an aspect of the present invention, a motor control method is provided including: acquiring, by an electric current detection result acquisition unit, a result of detecting an electric current for operating a motor; determining, by an electric current determination unit, whether or not the electric current acquired by the electric current detection result acquisition unit is greater than or equal to a predetermined threshold value; setting, by an operation time setting unit, an operation time period corresponding to the electric current when the electric current determination unit determines that the electric current is greater than or equal to the predetermined threshold value; and performing, by an operation control unit, control for causing the motor to be continuously operated for the operation time period set by the operation time setting unit.

According to the present aspect, in the motor control method, low cost can be achieved and a wide safe operation region can be secured.

<12> According to an aspect of the present invention, a motor control method is provided including: acquiring, by an electric current detection result acquisition unit, a result of detecting an electric current for operating a motor; determining, by an electric current determination unit, whether or not the electric current acquired by the electric current detection result acquisition unit exceeds a predetermined threshold value; setting, by an operation time setting unit, an operation time period corresponding to the electric current when the electric current determination unit determines that the electric current exceeds the predetermined threshold value; and performing, by an operation control unit, control for causing the motor to be continuously operated for the operation time period set by the operation time setting unit.

According to the present aspect, in the motor control method, low cost can be achieved and a wide safe operation region can be secured.

Here, a configuration in which the electric current determination unit determines whether or not the electric current acquired by the electric current detection result acquisition unit is greater than or equal to a predetermined threshold value (here referred to as a threshold value E2 for convenience of description) is used as an example and a configuration in which the electric current determination unit determines whether or not the electric current acquired by the electric current detection result acquisition unit exceeds a predetermined threshold value (here referred to as a threshold value F2 for convenience of description) is used as another example.

In this case, for example, the threshold value E2 and the threshold value F2 may be different values. Also, for example, it may be possible to obtain substantially the same determination result according to both the configurations by adjusting the threshold value E2 and the threshold value F2.

Also, for example, any of a program that determines whether or not the electric current is greater than or equal to the threshold value E2 and a program that determines whether or not the electric current exceeds the threshold value F2 may be adopted if the threshold value E2 and the threshold value F2 are the same value.

<13> According to an aspect of the present invention, a non-transitory computer-readable storage medium is provided that stores a program for causing a computer to implement: a function of acquiring a result of detecting an electric current for operating a motor; a function of determining whether or not the acquired electric current is greater than or equal to a predetermined threshold value; a function of setting an operation time period corresponding to the electric current when it is determined that the electric current is greater than or equal to the predetermined threshold value; and a function of performing control for causing the motor to be continuously operated for the set operation time period.

According to the present aspect, in the storage medium, low cost can be achieved and a wide safe operation region can be secured.

<14> According to an aspect of the present invention, a non-transitory computer-readable storage medium is provided that stores a program for causing a computer to implement: a function of acquiring a result of detecting an electric current for operating a motor; a function of determining whether or not the acquired electric current exceeds a predetermined threshold value; a function of setting an operation time period corresponding to the electric current when it is determined that the electric current exceeds the predetermined threshold value; and a function of performing control for causing the motor to be continuously operated for the set operation time period.

According to the present aspect, in the storage medium, low cost can be achieved and a wide safe operation region can be secured.

Here, a configuration in which it is determined whether or not the electric current is greater than or equal to a predetermined threshold value (here referred to as a threshold value E3 for convenience of description) is used as an example and a configuration in which it is determined whether or not the electric current exceeds a predetermined threshold value (here referred to as a threshold value F3 for convenience of description) is used as another example.

In this case, for example, the threshold value E3 and the threshold value F3 may be different values. Also, for example, by adjusting the threshold value E3 and the threshold value F3, it may be possible to obtain substantially the same determination result according to both the configurations.

Also, for example, any of a program that determines whether or not the electric current is greater than or equal to the threshold value E3 and a program that determines whether or not the electric current exceeds the threshold value F3 may be adopted if the threshold value E3 and the threshold value F3 are the same value.

According to the aspects of the present invention, in the motor control device, the motor control method, and the storage medium, low cost can be achieved and a wide safe operation region can be secured.

DETAILED DESCRIPTION OF THE INVENTION

Figure 1:
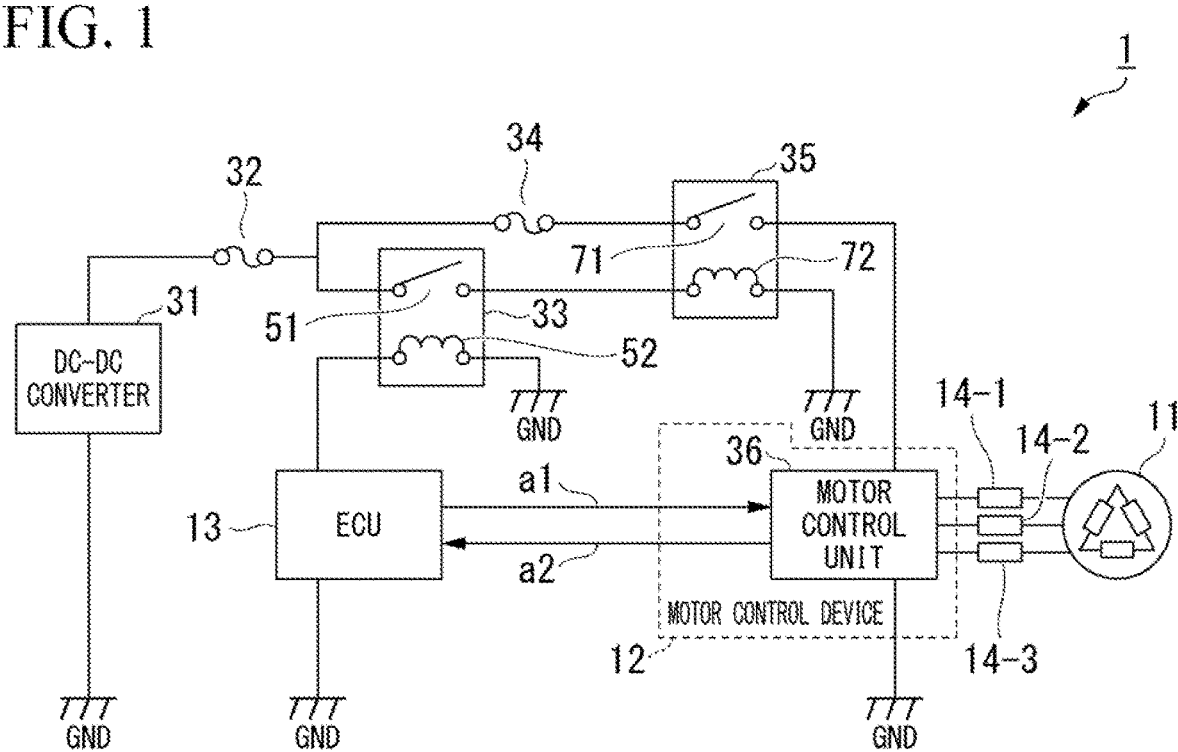
FIG. 1 is a diagram showing a schematic configuration of a vehicle including a motor control device according to an embodiment of the present invention.

Hereinafter, embodiments of the present invention will be described with reference to the drawings.
[Vehicle Including Motor Control Device]
FIG. 1 is a diagram showing a schematic configuration of a vehicle 1 including a motor control device 12 according to an embodiment of the present invention.

The vehicle 1 includes a motor 11, the motor control device 12, and an electronic control unit (ECU) 13.

The vehicle 1 also includes a DC-DC converter 31, a fuse 32, an ignition relay 33, a fuse 34, and a pump relay 35. Also, the vehicle 1 also includes electric current detection units 14-1 to 14-3.

The motor control device 12 includes a motor control unit 36.

As another example, the motor control device 12 may further include other components. For example, the motor control device 12 may include one or more of the ignition relay 33 and the pump relay 35.

Also, although the motor 11 and the motor control device 12 are described separately for convenience of description in the present embodiment, for example, the motor control device 12 may be a device that also includes the motor 11. Also, for example, the motor control device 12 may be a device including the electric current detection units 14-1 to 14-3.

The ignition relay 33 roughly includes a switch 51 and a coil unit 52. In the ignition relay 33, an electric current flows through the coil unit 52 and therefore the opening and closing of the switch 51 are controlled by an electromagnetic action. In the present embodiment, when the electric current flows through the coil unit 52 in the ignition relay 33, the switch 51 is turned on (in a closed state) and is brought into a conductive state.

The pump relay 35 roughly includes a switch 71 and a coil unit 72. In the pump relay 35, the electric current flows through the coil unit 72 and therefore the opening and closing of the switch 71 are controlled by an electromagnetic action. In the present embodiment, in the pump relay 35, when the electric current flows through the coil unit 72, the switch 71 is turned on (in a closed state) and is brought into a conductive state.

Also, any configurations may be used as each of the configuration of the ignition relay 33 and the configuration of the pump relay 35.

A predetermined terminal of the ECU 13, a predetermined terminal of the DC-DC converter 31, a predetermined terminal of the motor control unit 36, a predetermined terminal of the ignition relay 33 (one end of the coil unit 52 in the example of FIG. 1), and a predetermined terminal of the pump relay 35 (one end of the coil unit 72 in the example of FIG. 1) are grounded to the ground (GND).

The motor 11 drives a pump (not shown) of the pump drive unit in the present embodiment. For example, the pump drive unit may be configured as a part of an air conditioner.

The motor 11 is, for example, a three-phase induction motor. The rotation speed of the motor 11 is adjusted by a magnitude of the electric current supplied from the motor control device 12 to the motor 11.

Although a brushless motor is used as the motor 11 in the present embodiment, a brushed motor may be used as another example.

Also, although a case in which the motor control device 12 controls the motor 11 of the pump drive unit is shown in the present embodiment, the motor control device 12 may be applied when various other motors are controlled.

The ECU 13 is configured to include a processor such as a central processing unit (CPU).

The ECU 13 controls each unit of the vehicle 1 on the basis of an operation received by an operation unit (not shown). The operation unit is operated by a driver of the vehicle 1 or the like. Examples of the operation unit include an ignition switch, an accelerator pedal, a brake pedal, and an operation input unit of an air conditioner, and the like.

As a specific example, the ECU 13 sets the switch 51 in the conductive state by supplying a predetermined electric current to the coil unit 52 of the ignition relay 33 in accordance with the operation of the ignition switch, thereby setting the switch 71 of the pump relay 35 in the conductive state, and performs control so that electric power of a predetermined voltage is supplied to the motor control unit 36 or the like.

Also, as a specific example, the ECU 13 controls a vehicle drive unit (not shown) so that the vehicle 1 is moved at a desired speed.

Also, the ECU 13 controls the motor control unit 36 by transmitting a signal a1 to the motor control unit 36.

Also, the ECU 13 acquires information included in a received signal a2 by receiving the signal a2 transmitted from the motor control unit 36.

In the present embodiment, the DC-DC converter 31 inputs electric power supplied from a power supply (not shown), converts the input electric power according to DC-DC conversion, and outputs the converted electric power. The power supply is, for example, a secondary battery, but an external power supply may be used as another example.

In the present embodiment, each unit of the vehicle 1 performs an operation with the electric power supplied from the power supply.

The electric power output from the DC-DC converter 31 is input to the switch 51 of the ignition relay 33 via the fuse 32.

Also, when the switch 51 of the ignition relay 33 is turned on (in the closed state), the electric power input to the ignition relay 33 is output to the coil unit 72 of the pump relay 35. In this case, the switch 71 of the pump relay 35 is turned on (in the closed state).

Also, when the switch 51 of the ignition relay 33 is turned off (in an open state), no electric power is supplied to the coil unit 72 of the pump relay 35. In this case, the switch 71 of the pump relay 35 is turned off (in an open state).

Electric power output from the DC-DC converter 31 is input to the switch 71 of the pump relay 35 via the fuse 32 and the fuse 34.

Also, when the switch 71 of the pump relay 35 is turned on (in the closed state), the electric power input to the pump relay 35 is output to the motor control unit 36 and supplied.

Also, when the switch 71 of the pump relay 35 is turned off (in the open state), no electric power is supplied to the motor control unit 36.

The motor control unit 36 is driven by the electric power supplied from the DC-DC converter 31 via the pump relay 35 and outputs a predetermined electric current (which is also referred to as a motor control current for convenience of description) to the motor 11, so that an operation of the motor 11 is controlled.

Also, the motor control unit 36 is controlled by the ECU 13. Specifically, the motor control unit 36 receives the signal a1 transmitted from the ECU 13 and performs an operation according to the received signal a1.

Also, the motor control unit 36 transmits the signal a2 including predetermined information to the ECU 13. For example, the information may be information such as an Ack or Nack in communication or may be information indicating a situation of the motor control unit 36 or a situation of the motor 11. The situation may be, for example, a normal or abnormal situation.

Here, in the present embodiment, the motor control unit 36 includes an inverter circuit (not shown) for outputting the motor control current to the motor 11. For example, the inverter circuit may be configured as an H-bridge type three-phase inverter or may be configured in an H-bridge based on six transistors.

Also, in the present embodiment, the motor control unit 36 includes a position detection circuit (not shown) configured to detect the rotation of the rotor of the motor 11 including the stator and the rotor on the basis of a counter electromotive voltage generated when the motor 11 rotates and detect a position of the rotor.

For example, the motor control unit 36 uses the inverter circuit and the position detection circuit as described above to control the motor control current supplied from the inverter circuit to the motor 11 on the basis of the position detected by the position detection circuit.

As an example, the motor control unit 36 performs control for adjusting the rotation speed of the motor 11 so that a target rotation speed designated by the signal a1 transmitted from the ECU 13 to the motor control unit 36 is achieved.

Also, various techniques may be used as a technique in which the motor control unit 36 controls the motor control current. For example, a technique in which the motor control unit 36 performs control for adjusting an amount of electric current by continuously changing the amount of motor control current may be used as such a technique or the motor control unit 36 may perform control for adjusting an amount of electric current by performing switching between ON and OFF of the motor control current. Here, ON of the motor control current indicates a state in which the motor control current is flowing and OFF of the motor control current indicates a state in which the motor control current is not flowing.

Also, in the present embodiment, the vehicle 1 includes the electric current detection units 14-1 to 14-3 configured to detect the motor control current output from the motor control unit 36 to the motor 11. For example, the current detectors 14-1 to 14-3 detect an actual drive current of the motor 11 that flows through a closed circuit formed to include the ground (GND) and the above-described inverter circuit as the motor control current.

In the present embodiment, the motor control current is used as an electric current for operating the motor 11.

Here, in the present embodiment, the motor control unit 36 and the motor 11 are connected by three wires corresponding to three phases. In the present embodiment, one of the three electric current detection units 14-1 to 14-3 is provided for each of the three wires.

Each of the electric current detection units 14-1 to 14-3 detects an electric current flowing through the wire provided therefor and outputs information of a detection result to the motor control unit 36. The motor control unit 36 inputs the information output from the electric current detection units 14-1 to 14-3 and detects a magnitude of the electric current on the basis of the input information.

Also, although a case in which an electric current detection unit (one of the electric current detection units 14-1 to 14-3) is provided for each wire has been described in the present embodiment, the electric current detection units may be provided on only one wire or the electric current detection units may be provided on two wires as another example.

For example, the motor control unit 36 may detect the magnitude of the electric current on the basis of information input from the electric current detection unit provided on any one wire or may detect an average value of two or more electric currents or the like as the magnitude of the electric current on the basis of information input from the electric current detection units provided on two or three wires.

Any configuration may be used as a circuit configuration of the electric current detection units 14-1 to 14-3.

[Outline of Motor Control]

In the present embodiment, the motor control unit 36 monitors whether or not the motor control current flowing through the motor 11 exceeds a predetermined threshold value (an overcurrent threshold value) on the basis of an electric current detection signal input from the above-described electric current detection circuit (not shown). For example, this monitoring may be performed constantly.

When it is determined that the motor control current flowing through the motor 11 exceeds the overcurrent threshold value, the motor control unit 36 controls the operation of the motor 11 by controlling the motor control current flowing through the motor 11 in a control mode corresponding to the time of an overcurrent.

Further, in the present embodiment, the motor control unit 36 monitors whether or not the motor control current flowing through the motor 11 exceeds a predetermined threshold value (also referred to as an upper limit value for convenience of description) larger than the overcurrent threshold value. For example, this monitoring may be performed constantly.

When it is determined that the motor control current flowing through the motor 11 exceeds the upper limit value, the motor control unit 36 causes the operation of the motor 11 to be stopped by controlling the motor control current flowing through the motor 11 in a control mode corresponding to the time when the motor control current exceeds the upper limit value.

On the other hand, when the motor control unit 36 determines that the motor control current flowing through the motor 11 is less than or equal to the overcurrent threshold value, the motor control unit 36 controls the operation of the motor 11 so that the motor 11 is allowed to perform a normal operation.

Here, as the normal operation of the motor 11, for example, any predetermined operation may be used.

In the present embodiment, a rated operation is used as the normal operation of the motor 11.

Also, although an example of the outline of the control of the motor 11 is shown here, various other modes may be used as a mode in which the motor 11 is controlled.

As an example, a mode in which some control modes are further added to or omitted from the outline of the control of the motor 11 shown here may be used as the mode in which the motor 11 is controlled.

[Outline of Motor Control Unit]

Figure 2:
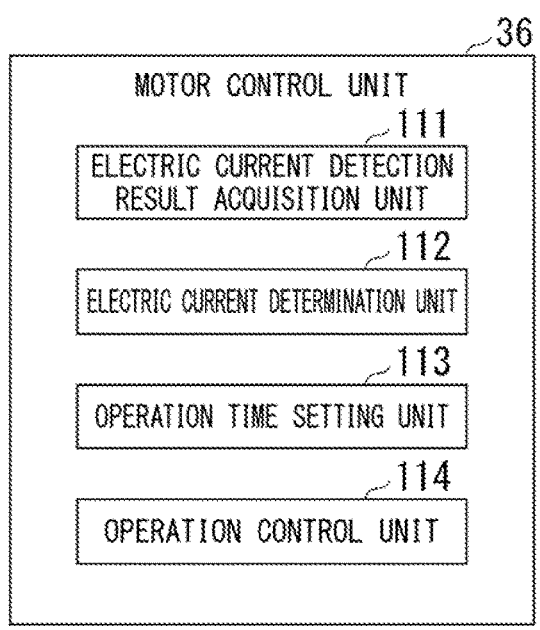
FIG. 2 is a diagram showing a schematic functional block configuration of a motor control unit according to an embodiment of the present invention.

FIG. 2 is a diagram showing a schematic functional block configuration of the motor control unit 36 according to the embodiment of the present invention.

The motor control unit 36 includes an electric current detection result acquisition unit 111, an electric current determination unit 112, an operation time setting unit 113, and an operation control unit 114.

The electric current detection result acquisition unit 111 acquires a result of detecting the electric current for operating the motor 11 (the motor control current). In the present embodiment, the electric current detection result acquisition unit 111 acquires a detection result of the above-described electric current detection circuit (not shown) as the electric current detection result.

The electric current determination unit 112 makes a predetermined determination on a magnitude of the electric current indicated by the electric current detection result acquired by the electric current detection result acquisition unit 111.

The operation time setting unit 113 sets an operation time period based on a result of this determination made by the electric current determination unit 112.

The operation control unit 114 controls the operation of the motor 11. In the present embodiment, the operation control unit 114 controls the operation of the motor 11 by controlling the motor control current that is output to the motor 11.

[Relationship between Electric Current and Operation Time Period]

Figure 3:
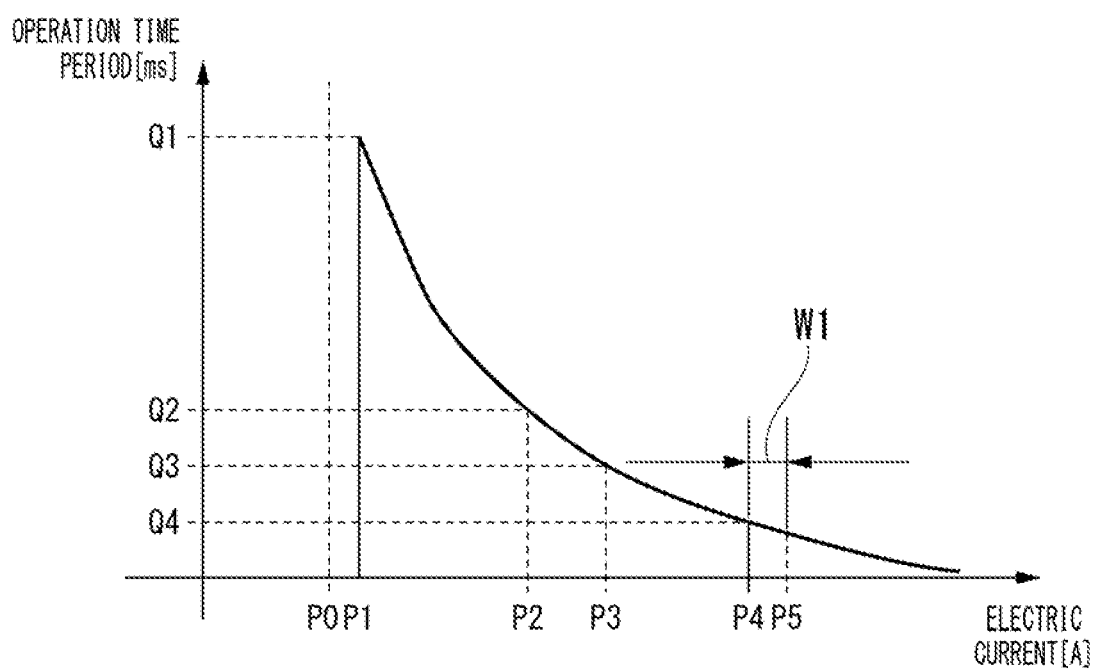
FIG. 3 is a diagram showing an example of a relationship between an electric current and an operation time period according to an embodiment of the present invention.

FIG. 3 is a diagram showing an example of a relationship between an electric current and an operation time period according to an embodiment of the present invention. In a graph shown in FIG. 3, the horizontal axis represents an electric current [A] and the vertical axis represents an operation time period [ms].

Here, the electric current of the horizontal axis is an electric current for driving the motor 11 and corresponds to an electric current indicated by an electric current detection result acquired by the electric current detection result acquisition unit 111 in the present embodiment.

Also, the operation time period of the vertical axis corresponds to an operation time period set by the operation time setting unit 113.

Electric currents P0 to P5 and operation time periods Q1 to Q4 shown in FIG. 3 will be described.

Also, in the example of FIG. 3, the electric current P0, the electric current P1, the electric current P2, the electric current P3, the electric current P4, and the electric current P5 are arranged in order from a smaller value to a larger value. Also, in the example of FIG. 3, the operation time period Q1, the operation time period Q2, the operation time period Q3, and the operation time period Q4 are arranged in order from a larger value to a smaller value.

The electric current P0 is a rated electric current of the motor 11.

The electric current P1 is set as an overcurrent threshold value. Although the electric current P1 greater (for example, slightly greater) than the electric current P0 is set as an overcurrent threshold value in the present embodiment, the value of the electric current P0 may be set as the overcurrent threshold value or an electric current less (for example, slightly less) than the electric current P0 may be set as the overcurrent threshold value as another example.

Also, for example, the overcurrent threshold value is set on the basis of a result of confirming a condition that the performance of a product does not deteriorate due to the operation of the motor 11 according to simulation and the like before a device in which the overcurrent threshold value is set is shipped as the product. In this case, for example, overcurrent threshold values set for individual products of the same type may be different or the same overcurrent threshold value may be set for different individual products of the same type when an error is allowed.

The operation time period Q1 is associated with the electric current P1. In the present embodiment, the fact that no problem occurs in the motor 11 and the like even if the electric current P1 continuously flows through the motor 11 for the operation time period Q1 is confirmed according to simulation and the like in advance.

Likewise, the operation time period Q2 is associated with the electric current P2. In the present embodiment, the fact that no problem occurs in the motor 11 and the like even if the electric current P2 continuously flows through the motor 11 for the operation time period Q2 is confirmed according to simulation and the like in advance.

Likewise, the operation time period Q3 is associated with the electric current P3. In the present embodiment, the fact that no problem occurs in the motor 11 and the like even if the electric current P3 continuously flows through the motor 11 for the operation time period Q3 is confirmed according to simulation and the like in advance.

The electric current P4 is set as an upper limit threshold value (an upper limit value).

The operation time period Q4 is associated with the electric current P4. In the present embodiment, the fact that no problem occurs in the motor 11 and the like even if the electric current P4 continuously flows through the motor 11 for the operation time period Q4 is confirmed according to simulation and the like in advance.

Also, for example, the upper limit value is set on the basis of a result of confirming a condition that the performance of a product does not deteriorate due to the operation of the motor 11 according to simulation and the like before a device in which the upper limit value is set is shipped as the product. In this case, for example, upper limit values set for individual products of the same type may be different or the same upper limit value may be set for different individual products of the same type when an error is allowed.

The electric current P5 is an electric current of a magnitude for which a problem is likely to occur in the motor 11 when the electric current flows through the motor 11. In the present embodiment, the electric current P4 less (for example, slightly less) than the electric current P5 is set as the upper limit value. That is, a margin W1 corresponding to a difference between the electric current P5 and the electric current P4 is secured, thereby reducing a possibility that a problem will occur in the motor 11.

Here, in the example of FIG. 3, 0 is set as the operation time period for the electric current exceeding the electric current P4 corresponding to the upper limit value.

As an example, the above-described setting of the operation time period of 0 may be explicitly performed. In this case, the operation time setting unit 113 sets the operation time period of 0 with respect to an electric current exceeding the electric current P4 corresponding to the upper limit value.

As another example, when the operation time period of 0 is not set and the operation time period corresponding to the electric current for operating the motor 11 is not defined, the operation time period may be treated as 0. As a specific example, in the configuration in which the operation of the motor 11 is stopped when the electric current for operating the motor 11 exceeds the upper limit value, the operation time setting unit 113 does not necessarily have to set the operation time period when the electric current for operating the motor 11 exceeds the upper limit value.

In the example of FIG. 3, when the electric current flowing through the motor 11 is less than or equal to the electric current P1, for example, a normal operation is performed generally. Also, when the electric current flowing through the motor 11 exceeds the electric current P1 and is less than or equal to the electric current P4, for example, control using the operation time period is performed. When the electric current flowing through the motor 11 exceeds the electric current P4, for example, control for causing the motor 11 to be stopped is performed.

Here, although a case in which the corresponding relationship between the electric current flowing through the motor 11 and the operation time period is represented by a continuous graph (or an equation may be used) is shown in the example of FIG. 3, a table in which a plurality of different discrete electric currents and operation time periods corresponding thereto are associated may be used as another example. In this case, the operation time setting unit 113 sets the operation time period corresponding to the measured electric current value with reference to content of the table. At this time, the operation time setting unit 113 may set an operation time period corresponding to another electric current close to the measured electric current value, for example, when information of the operation time period related to the electric current corresponding to the measured electric current value is not present in the table, or may set a result of interpolating operation time periods corresponding to two or more other electric currents close to the measured electric current value as an operation time period.

Also, the measured value may be called, for example, a detected value or an actually measured value.

[Examples of Mode in Which Motor is Controlled]

Figure 4:
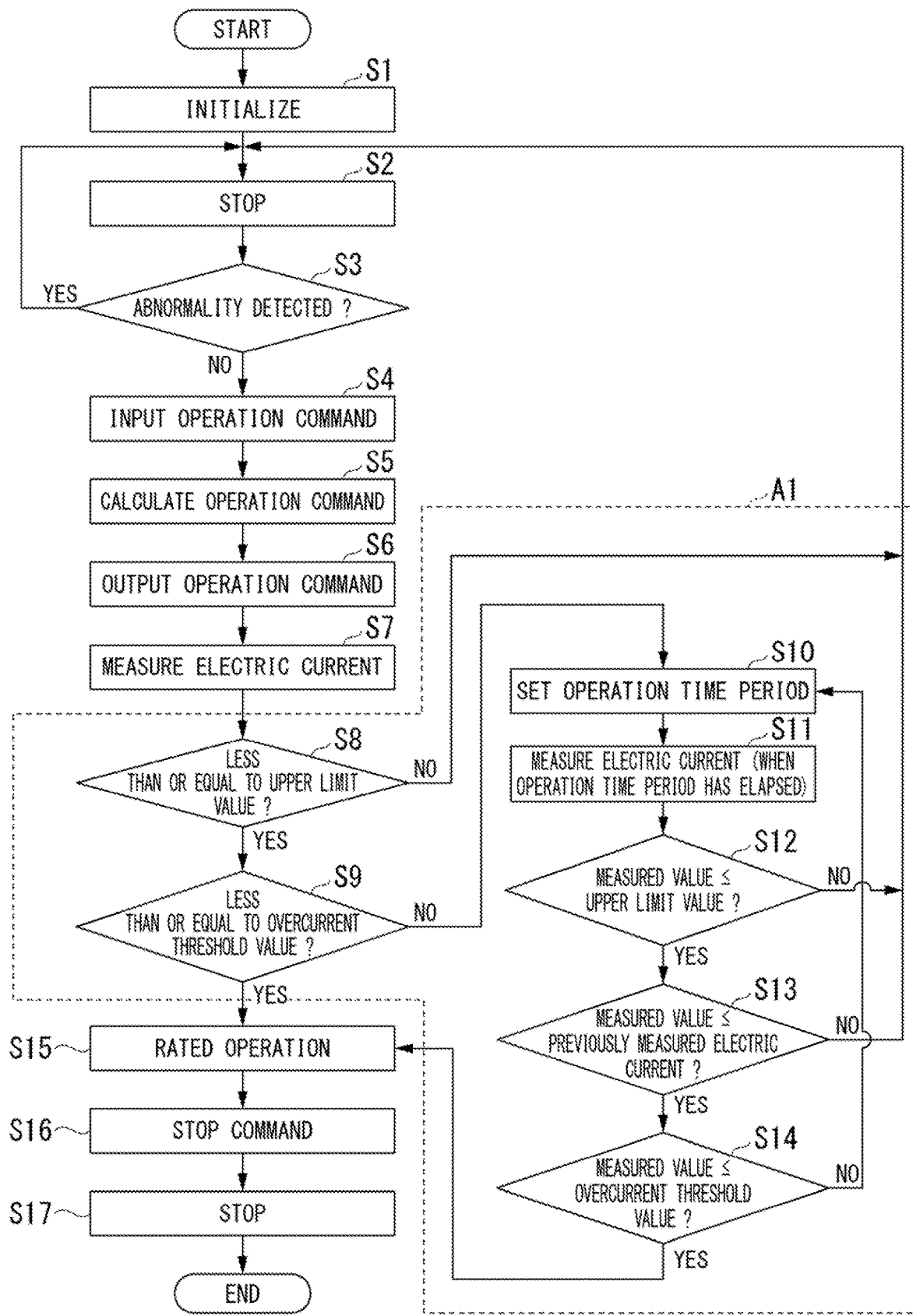
FIG. 4 is a diagram showing an example of a procedure of a process to be performed by the motor control unit according to an embodiment of the present invention.

FIG. 4 is a diagram showing an example of a procedure of processing to be performed by the motor control unit 36 according to the embodiment of the present invention.

(Step S1)

The motor control unit 36 initializes the drive control of the motor 11. The motor control unit 36 proceeds to the processing of step S2.

Here, the initialization is performed, for example, for a part or all of the motor control unit 36 and the motor 11.

(Step S2)

The motor control unit 36 is in a state in which the motor 11 is stopped. The motor control unit 36 proceeds to the processing of step S3.

(Step S3)

The motor control unit 36 determines whether or not there is a predetermined abnormality.

Regarding a result of this determination, when it is determined that there is no predetermined abnormality (step S3: NO), the motor control unit 36 proceeds to step S4.

On the other hand, regarding a result of this determination, when it is determined that there is a predetermined abnormality (step S3: YES), the motor control unit 36 proceeds to the processing of step S2 and maintains the state in which the motor 11 is stopped.

Here, any one or more abnormalities may be used as the predetermined abnormality.

(Step S4)

The motor control unit 36 inputs an operation command. The motor control unit 36 proceeds to step S5. Here, in the present embodiment, a case in which an operation command given from the ECU 13 to the motor control unit 36 is used as the operation command handled by the motor control unit 36 is shown. In the motor control unit 36, the operation command is given by a signal a1 transmitted from the ECU 13 to the motor control unit 36.

(Step S5)

The motor control unit 36 performs predetermined calculation on the basis of the input operation command. The motor control unit 36 proceeds to the processing of step S6.

(Step S6)

The motor control unit 36 outputs a motor control current according to an operation command obtained by the predetermined calculation to the motor 11. The motor control unit 36 proceeds to the processing of step S7.

(Step S7)

In the motor control unit 36, the electric current detection result acquisition unit 111 acquires an electric current detection result. The motor control unit 36 proceeds to the processing of step S8.

Here, the electric current is measured after the operation command is output to the motor 11. In the present embodiment, the motor control current detected by the above-described electric current detection circuit (not shown) is used as a measured electric current value.

(Step S8)

In the motor control unit 36, the electric current determination unit 112 determines whether or not the measured electric current value is less than or equal to a predetermined upper limit value.

Regarding a result of this determination, when the electric current determination unit 112 determines that the measured electric current value is less than or equal to the predetermined upper limit value (step S8: YES), the motor control unit 36 proceeds to the processing of step S9.

On the other hand, regarding a result of this determination, when the electric current determination unit 112 determines that the measured electric current value exceeds the predetermined upper limit value (step S8: NO), the motor control unit 36 proceeds to the processing of step S2.

(Step S9)

In the motor control unit 36, the electric current determination unit 112 determines whether or not the measured electric current value is less than or equal to a predetermined overcurrent threshold value.

Regarding a result of this determination, when the electric current determination unit 112 determines that the measured electric current value is less than or equal to the predetermined overcurrent threshold value (step S9: YES), the motor control unit 36 proceeds to the processing of step S15.

On the other hand, regarding a result of this determination, when the electric current determination unit 112 determines that the measured electric current value exceeds the predetermined overcurrent threshold value (step S9: NO), the motor control unit 36 proceeds to the processing of step S10.

(Step S10)

In the motor control unit 36, the operation time setting unit 113 sets an operation time period according to the measured electric current value. The motor control unit 36 proceeds to the processing of step S11.

(Step S11)

In the motor control unit 36, the electric current detection result acquisition unit 111 acquires the electric current detection result at a predetermined timing when the operation time period has elapsed after the setting of the operation time period by the operation time setting unit 113. The motor control unit 36 proceeds to the processing of step S12.

Here, for example, the timing when the operation time period has elapsed is used as the predetermined timing, but another timing may be used.

(Step S12)

In the motor control unit 36, the electric current determination unit 112 determines whether or not the measured electric current value is less than or equal to a predetermined upper limit value.

Regarding a result of this determination, when the electric current determination unit 112 determines that the measured electric current value is less than or equal to the predetermined upper limit value (step S12: YES), the motor control unit 36 proceeds to the processing of step S13.

On the other hand, regarding a result of this determination, when the electric current determination unit 112 determines that the measured electric current value exceeds the predetermined upper limit value (step S12: NO), the motor control unit 36 proceeds to the processing of step S2.

(Step S13)

In the motor control unit 36, the electric current determination unit 112 determines whether or not a currently measured electric current value is less than or equal to a previously measured electric current value.

Regarding a result of this determination, when the electric current determination unit 112 determines that the currently measured electric current value is less than or equal to the previously measured electric current value (step S13: YES), the motor control unit 36 performs the processing of step S14.

On the other hand, regarding a result of this determination, when the electric current determination unit 112 determines that the currently measured electric current value exceeds the previously measured electric current value (step S13: NO), the motor control unit 36 proceeds to step S2.

(Step S14)

In the motor control unit 36, the electric current determination unit 112 determines whether or not the currently measured electric current value is less than or equal to a predetermined overcurrent threshold value.

Regarding a result of this determination, when the electric current determination unit 112 determines that the currently measured electric current value is less than or equal to the predetermined overcurrent threshold value (step S14: YES), the motor control unit 36 performs the processing of step 515.

On the other hand, regarding a result of this determination, when the electric current determination unit 112 determines that the currently measured electric current value exceeds the predetermined overcurrent threshold value (step S14: NO), the motor control unit 36 proceeds to the processing of step S10.

(Step S15)

In the motor control unit 36, the operation control unit 114 performs control for causing the motor 11 to perform a normal operation (a rated operation in the present embodiment). The motor control unit 36 proceeds to the processing of step S16.

(Step S16)

The motor control unit 36 inputs a stop command. The motor control unit 36 proceeds to the processing of step 517.

Here, a case in which a stop command given from the ECU 13 to the motor control unit 36 is used as the stop command handled by the motor control unit 36 is shown in the present embodiment. The stop command is given to the motor control unit 36 by the signal a1 transmitted from the ECU 13 to the motor control unit 36.

Also, although the operation command and the stop command are distinguished from each other in the present embodiment, the stop command may be a type of operation command as another example.

(Step S17)

The motor control unit 36 causes the motor 11 to be stopped.

The present process flow ends.

Here, in the example of FIG. 4, a part of a processing block A1 including the processing of steps S8 to S14 is a process of handling an overcurrent. Also, although the processing block A1 includes the processing of step S9 in the example of FIG. 4, the processing block A1 may not include the processing of step S8, i.e., the processing block A1 may include the processing of steps S9 to S14 as another example.

Also, in the example of FIG. 4, when the electric current determination unit 112 determines that the currently measured electric current value exceeds the previously measured electric current value in the processing of step S13 (step S13: NO), the motor control unit 36 proceeds to the processing of step S2 but another mode may be used.

As an example of the other mode, when the electric current determination unit 112 determines that the currently measured electric current value exceeds the previously measured electric current value in the processing of step S13 (step S13: NO), a mode in which the motor control unit 36 proceeds to the processing of step S10 may be used.

Also, as the processing of step S8, in the motor control unit 36, the electric current determination unit 112 may use a process of determining whether or not the measured electric current value is less than the predetermined upper limit value instead of a process of determining whether or not the measured electric current value is less than or equal to the predetermined upper limit value.

Also, as the processing of step S9, in the motor control unit 36, the electric current determination unit 112 may use a process of determining whether or not the measured electric current value is less than the predetermined overcurrent value instead of a process of determining whether or not the measured electric current value is less than or equal to the predetermined overcurrent value.

Also, as the processing of step S12, in the motor control unit 36, the electric current determination unit 112 may use a process of determining whether or not the measured electric current value is less than the predetermined upper limit value instead of a process of determining whether or not the measured electric current value is less than or equal to the predetermined upper limit value.

Also, as the processing of step S13, in the motor control unit 36, the electric current determination unit 112 may use a process of determining whether or not the currently measured electric current value is less than the previously measured electric current value instead of a process of determining whether or not the currently measured electric current value is less than or equal to the previously measured electric current value.

Also, as the processing of step S14, in the motor control unit 36, the electric current determination unit 112 may use a process of determining whether or not the currently measured electric current value is less than the predetermined overcurrent threshold value instead of a process of determining whether or not the currently measured electric current value is less than or equal to the predetermined overcurrent threshold value.

Although a process of determining whether or not the currently measured electric current value is less than or equal to the previously measured electric current value is performed in the processing of step S13 in the example of FIG. 4, this process may not be performed as an example of another process flow. In the other process flow, when the measured electric current value is less than or equal to the upper limit value in the determination in step S12 in the example of FIG. 4 (step S12: YES), the process proceeds to the processing of step S14.

Also, although a process of determining whether or not the measured electric current value is less than or equal to the upper limit value is performed in the processing of step S12 in the example of FIG. 4, this process may not be performed as an example of another process flow. In the other process flow, after the processing of step S11 in the example of FIG. 4, the process proceeds to the processing of step S13.

Also, as an example of the other process flow, in the example of FIG. 4, the processing of step S12 and the processing of step S13 may not be performed. In the other process flow, after the processing of step S11 in the example of FIG. 4, the process proceeds to the processing of step S14.

Also, although a process of determining whether or not the measured electric current value is less than or equal to the upper limit value is performed in the processing of step S8 in the example of FIG. 4, this process may not be performed as an example of another process flow. In the other process flow, after the processing of step S7 in the example of FIG. 4, the process proceeds to the processing of step S9.

Also, as an example of another process flow, a processing step related to a demagnetized electric current may be provided between the processing of step S7 and the processing of step S8 in the example of FIG. 4. Here, for convenience of description, this step is referred to as step S7a for description.

In this case, the following process is performed in a processing part from the processing of step S7 to the processing of step S8.

That is, the motor control unit 36 proceeds to the processing of step S7a after the processing of step S7.

(Step S7a)

In the motor control unit 36, the electric current determination unit 112 determines whether or not the measured electric current value is less than or equal to a predetermined demagnetized electric current threshold value.

Regarding a result of this determination, when the electric current determination unit 112 determines that the measured electric current value is less than or equal to the predetermined demagnetized electric current threshold value (step S7a: YES), the motor control unit 36 proceeds to the processing of step S8.

On the other hand, regarding a result of this determination, when the electric current determination unit 112 determines that the measured electric current value exceeds the predetermined demagnetized electric current threshold value (step S7a: NO), the motor control unit 36 proceeds to the processing of step S2.

Also, in the present embodiment, in the example of FIG. 3, an allowed maximum operation time period for which performance of the motor 11 does not deteriorate is associated with an electric current that exceeds the overcurrent threshold value, so that a time interval (an operation time period) until the measured electric current value is acquired again can be set to an allowed maximum time interval (operation time period) in the processing of steps S9 and S10. In this case, a frequency at which the motor 11 stops can be curbed and the operation of the motor 11 becomes efficient.

As another example, any operation time period less than the allowed maximum operation time period for which performance of the motor 11 does not deteriorate and greater than 0 may be set with respect to an electric current exceeding the overcurrent threshold value. That is, no problem occurs in the motor 11 even if the electric current flows through the motor 11 for any time period less than or equal to the allowed maximum operation time period for which performance of the motor 11 does not deteriorate even if the electric current exceeds the overcurrent threshold value.

[Difference between Situations According to Presence and Absence of Overheat Protection Circuit]

A difference between situations according to the presence and absence of an overheat protection circuit will be described.

Here, it is assumed that the overheat protection circuit is a circuit for preventing the motor 11 and the motor control device 12 from overheating and protecting the motor 11 and the motor control device 12 and is a circuit that requires a hardware circuit without being implemented only by a process of software and requires an arrangement space and cost.

Also, although description will be given under the assumption that there is no overheat protection function in a component other than such an overheat protection circuit here, the present embodiment is not limited thereto.

Figure 5:
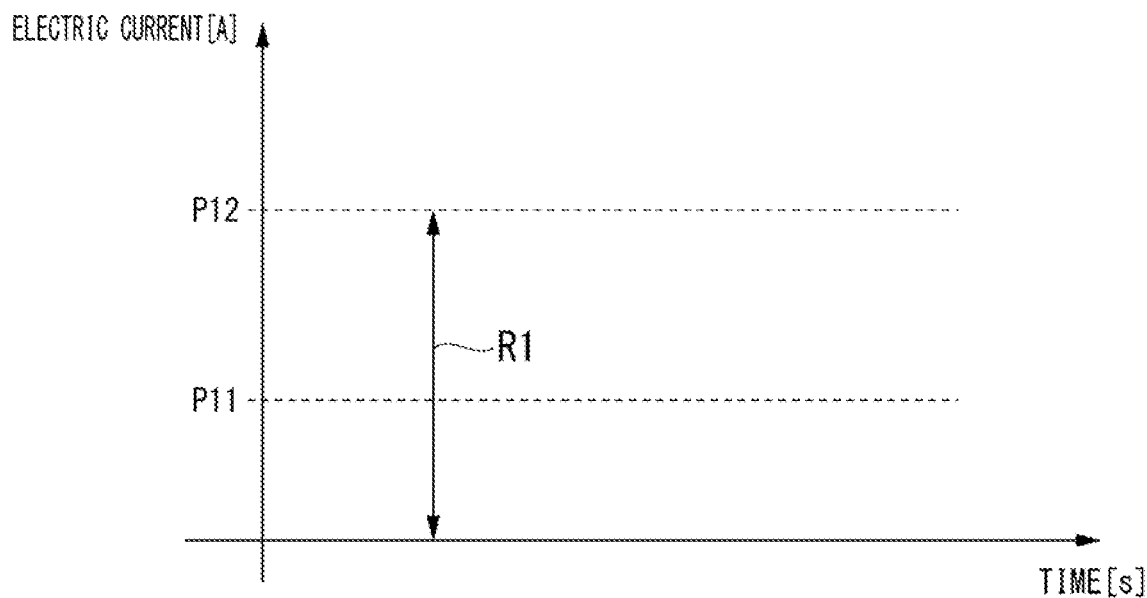
FIG. 5 is a diagram showing an example of a safe operation region when there is an overheat protection circuit.

FIG. 5 is a diagram showing an example of a safe operation region R1 when there is an overheat protection circuit. In the graph shown in FIG. 5, the horizontal axis represents time [s] and the vertical axis represents an electric current [A].

In the example of FIG. 5, an electric current P11 corresponds to a rated electric current and an electric current P12 is an electric current having a magnitude corresponding to a stop threshold value. The stop threshold value corresponds to a threshold value for stopping the operation of the motor. That is, the operation of the motor is stopped when the electric current for operating the motor exceeds the stop threshold value.

In the example of FIG. 5, a region having a width corresponding to the magnitude of the electric current P12 corresponding to the stop threshold value becomes a region where the motor can be safely operated (the safe operation region R1).

Figure 6:
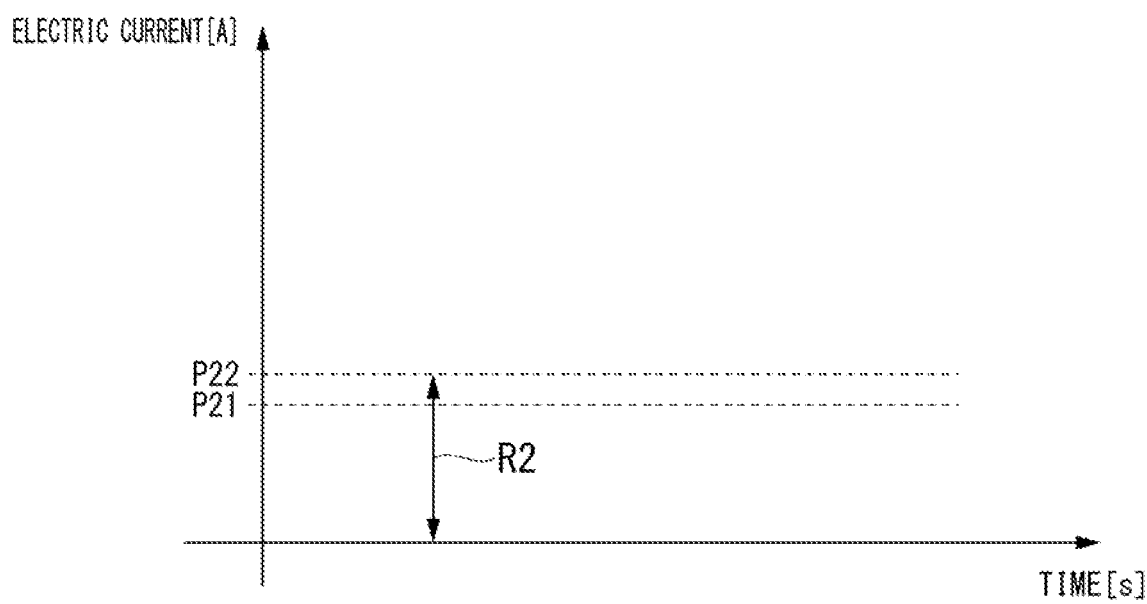
FIG. 6 is a diagram showing an example of a safe operation region when there is no overheat protection circuit.

FIG. 6 is a diagram showing an example of a safe operation region R2 when there is no overheat protection circuit. In the graph shown in FIG. 6, the horizontal axis represents time [s] and the vertical axis represents electric current [A].

In the example of FIG. 6, the electric current P21 corresponds to the rated electric current and the electric current P22 is an electric current having a magnitude corresponding to the stop threshold value. The stop threshold value corresponds to a threshold value for stopping the operation of the motor. That is, the operation of the motor is stopped when the electric current for operating the motor exceeds the stop threshold value.

In the example of FIG. 6, a region having a width corresponding to a magnitude of the electric current P22 corresponding to the stop threshold value becomes a region where the motor can be safely operated (the safe operation region R2).

Here, when the example of FIG. 5 and the example of FIG. 6 are compared, the electric currents P11 and P21, which are the rated electric currents, have, for example, the same value. On the other hand, in relation to the stop threshold value, the electric current P12 corresponding to the stop threshold value when the overheat protection circuit is provided can be made larger than the electric current P22 corresponding to the stop threshold value when the overheat protection circuit is not provided. This is because, when the overheat protection circuit is provided, the safety can be improved by the overheat protection circuit even if the stop threshold value is increased. Thus, the safe operation region R2 when the overheat protection circuit is not provided is narrower than the safe operation region R1 when the overheat protection circuit is provided.

However, for example, the scale of the circuit or device is larger and the cost is higher when there is an overheat protection circuit than when there is no overheat protection circuit.

In relation to this, the motor control device 12 according to the present embodiment can substantially widen the safe operation region by performing the control using the operation time period even if the overheat protection circuit is not provided.

[About Above Embodiments]

As described above, in the motor control device 12 according to the present embodiment, even if the electric current for operating the motor 11 exceeds the overcurrent threshold value, the electric current flows through the motor 11 for the operation time period set in correspondence with the electric current. Thus, in the motor control device 12 according to the present embodiment, it is possible to curb stopping of the operation of the motor 11 and it is possible to substantially expand the safe operation region.

Also, because the overheat protection circuit (or an electronic component corresponding to the overheat protection circuit) does not have to be mounted in the motor control device 12 according to the present embodiment, it is possible to reduce the arrangement space and reduce the cost as compared with when such a circuit is mounted.

In this manner, the motor control device 12 according to the present embodiment can achieve low cost and secure a wide safe operation region. In the motor control device 12 according to the present embodiment, for example, it is possible to improve load resistance variability by securing a wide safe operation region.

For example, although a wide safe operation region can be secured when an overheat protection circuit such as a temperature sensor is provided in a motor control device, it is necessary to secure a space in which the overheat protection circuit is arranged and the cost required for a circuit such as the temperature sensor may increase. On the other hand, although it is possible to save the space and curb the cost when such a heating protection circuit is not provided in the motor control device, the safe operation region may be narrowed.

Therefore, even if the overheat protection circuit is not provided in the motor control device 12 according to the present embodiment, a product can be guaranteed, low cost can be achieved, a wide safe operation region can be secured, and load resistance variability can be improved.

Also, although the motor control device 12 that controls the motor 11 of the electric water pump in the vehicle 1 is shown in the present embodiment, the device such as the motor control device 12 according to the present embodiment may be applied to various motors of various devices.

As a specific example, the motor control device 12 according to the present embodiment performs the following operation. That is, the electric current detection result acquisition unit 111 acquires a result of detecting an electric current for operating the motor 11 (a motor control current). The electric current determination unit 112 determines whether or not the electric current acquired by the electric current detection result acquisition unit 111 exceeds a predetermined threshold value (an overcurrent threshold value). The operation time setting unit 113 sets an operation time period corresponding to the electric current when the electric current determination unit 112 determines that the electric current exceeds the predetermined threshold value. The operation control unit 114 performs control for causing the motor 11 to be continuously operated for the operation time period set by the operation time setting unit 113.

Therefore, the motor control device 12 can achieve low cost and secure a wide safe operation region.

Also, the motor control device 12 according to the present embodiment performs the following operation.

That is, the electric current determination unit 112 makes a predetermined determination on an electric current acquired by the electric current detection result acquisition unit 111 after control is performed by the operation control unit 114 (a detection result newly obtained with respect to a previously determined detection result).

Therefore, the motor control device 12 can confirm whether or not the electric current for operating the motor 11 is less than or equal to the overcurrent threshold value, for example, without causing the operation of the motor 11 to be stopped.

Also, the motor control device 12 according to the present embodiment performs the following operation.

That is, the electric current determination unit 112 determines whether or not an electric current acquired by the electric current detection result acquisition unit 111 (a detection result newly obtained with respect to the previously determined detection result) after control is performed by the operation control unit 114 exceeds the electric current previously acquired by the electric current detection result acquisition unit 111 as the predetermined determination. When the electric current determination unit 112 determines that the electric current acquired by the electric current detection result acquisition unit 111 exceeds the electric current previously acquired by the electric current detection result acquisition unit 111, the operation control unit 114 performs control for causing the motor 11 to be stopped.

Therefore, the motor control device 12 can cause the operation of the motor 11 to be stopped when a current detection result exceeds a previous detection result with respect to the electric current for operating the motor 11. In this case, because the electric current for operating the motor 11 increases while exceeding the overcurrent threshold value, the operation of the motor 11 is stopped.

Also, the motor control device 12 according to the present embodiment performs the following operation.

That is, the electric current determination unit 112 determines whether or not the electric current acquired by the electric current detection result acquisition unit 111 exceeds a predetermined threshold value (an overcurrent threshold value) when the electric current acquired by the electric current detection result acquisition unit 111 (a detection result newly obtained with respect to the previously determined detection result) exceeds the electric current previously acquired by the electric current detection result acquisition unit 111. When the electric current determination unit 112 determines that the electric current exceeds the predetermined threshold value, the operation time setting unit 113 sets the operation time period corresponding to the electric current. The operation control unit 114 performs control for causing the motor 11 to be continuously operated for the operation time period set by the operation time setting unit 113.

Therefore, the motor control device 12 can cause the operation of the motor 11 to be continued when a current detection result is less than or equal to a previous detection result with respect to the electric current for operating the motor 11. In this case, because the electric current for operating the motor 11 decreases, the operation of the motor 11 is continued.

Also, the motor control device 12 according to the present embodiment performs the following operation.

That is, the electric current determination unit 112 determines whether or not an electric current acquired by the electric current detection result acquisition unit 111 (a detection result newly obtained with respect to the previously determined detection result) after control is performed by the operation control unit 114 exceeds the electric current previously acquired by the electric current detection result acquisition unit 111 as the predetermined determination. When the electric current determination unit 112 determines that the electric current acquired by the electric current detection result acquisition unit 111 exceeds the electric current previously acquired by the electric current detection result acquisition unit 111, the operation control unit 114 sets an operation time period corresponding to the electric current and the operation control unit 114 performs control for causing the motor 11 to be continuously operated for the operation time period set by the operation time setting unit 113.

Therefore, the motor control device 12 can cause the operation of the motor 11 to be continued when the current detection result exceeds the previous detection result with respect to the electric current for operating the motor 11. In this case, although the electric current for operating the motor 11 increases, the operation of the motor 11 is continued.

Also, the motor control device 12 according to the present embodiment performs the following operation.

That is, when the electric current determination unit 112 determines that the electric current does not exceed the predetermined threshold value in the motor control device 12, a predetermined normal operation is set as the operation of the motor 11.

Therefore, the motor control device 12 can perform the normal operation when the electric current for operating the motor 11 is less than or equal to the overcurrent threshold value.

Also, the motor control device 12 according to the present embodiment performs the following operation.

That is, the operation time setting unit 113 has a corresponding relationship between the electric current for operating the motor 11 and the operation time period in advance and sets the operation time period on the basis of the corresponding relationship.

Therefore, in the motor control device 12, for example, a corresponding relationship obtained in advance by an experiment or the like can be used as the corresponding relationship between the electric current for operating the motor 11 and the operation time period.

Also, the motor control device 12 according to the present embodiment performs the following operation.

That is, the electric current determination unit 112 determines whether or not the electric current acquired by the electric current detection result acquisition unit 111 exceeds a predetermined upper limit value (a value larger than the overcurrent threshold value). The operation control unit 114 performs control for causing the operation of the motor 11 to be stopped when the electric current determination unit 112 determines that the electric current acquired by the electric current detection result acquisition unit 111 exceeds the predetermined upper limit value.

Therefore, the motor control device 12 can cause the operation of the motor 11 to be stopped when the electric current for operating the motor 11 exceeds the upper limit value.

Also, the motor control device 12 according to the present embodiment performs the following operation.

That is, the predetermined upper limit value is set to a value that is a margin less than the allowed maximum electric current value described above.

Therefore, in the motor control device 12, it is possible to reliably prevent a problem from occurring in the motor 11 due to a high electric current because the upper limit value is set in consideration of the margin.

Also, in the motor control method performed by the motor control device 12 according to this embodiment, the following operation is performed.

That is, the electric current detection result acquisition unit 111 acquires a result of detecting an electric current for operating the motor 11. The electric current determination unit 112 determines whether or not the electric current acquired by the electric current detection result acquisition unit 111 exceeds a predetermined threshold value (an overcurrent threshold value). When the electric current determination unit 112 determines that the electric current exceeds the predetermined threshold value, the operation time setting unit 113 sets an operation time period corresponding to the electric current. The operation control unit 114 performs control for causing the motor 11 to be continuously operated for the operation time period set by the operation time setting unit 113.

Therefore, in the motor control method, it is possible to achieve low cost and secure a wide safe operation region.

Also, a program applied to a computer constituting the motor control device 12 according to the present embodiment performs the following operation.

That is, the program has a function of causing the computer to acquire a result of detecting an electric current for operating the motor 11, a function of determining whether or not the acquired electric current exceeds a predetermined threshold value (an overcurrent threshold value), a function of setting an operation time period corresponding to the electric current when it is determined that the electric current exceeds the predetermined threshold value, and a function of performing control for causing the motor 11 to be continuously operated for the set operation time period.

Therefore, in the program, it is possible to achieve low cost and secure a wide safe operation region.

Here, as a determination of a magnitude relationship between a certain value (here, referred to as value A1 for convenience of description) and a predetermined value (here, referred to as value TH1 for convenience of description), for example, a determination of whether or not the value A1 exceeds the predetermined value TH1 may be made or a determination of whether or not value A1 is greater than or equal to the predetermined value TH1 may be made.

Also, as a determination of a magnitude relationship between a certain value (here, referred to as value A2 for convenience of description) and a predetermined value (here, referred to as value TH2 for convenience of description), for example, a determination of whether or not the value A2 is less than or equal to the predetermined value TH2 (i.e., whether or not the value A2 exceeds the predetermined value TH2) may be made or a determination of whether or not the value A2 is less than the predetermined value TH2 may be made.

Also, as another embodiment, the present invention may be configured as a program recording medium, a vehicle, or the like.

Also, a process may be performed by recording (storing) a program for implementing functions of each device (for example, the motor control device 12 or the like) according to the above-described embodiment on a computer-readable recording medium (a storage medium) and causing a computer system to read and execute the program recorded on the recording medium.

Also, the "computer system" used here may include an operating system (OS) and hardware such as peripheral devices.

Also, the "computer-readable recording medium" refers to a storage device including a writable nonvolatile memory such as a flexible disk, a magneto-optical disc, a read only memory (ROM), or a flash memory, a portable medium such as a digital versatile disc (DVD), and a hard disk embedded in the computer system.

Also, for example, the "computer-readable recording medium" may be a non-transitory recording medium.

Furthermore, the "computer-readable recording medium" is assumed to include a medium that holds a program for a constant period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions. Further, the above-described program may be a program capable of implementing the above-described function in combination with a program already recorded on the computer system, i.e., a so-called differential file (differential program).

A function of any constituent unit of any device described above may be implemented by a processor. For example, each process in the present embodiment may be implemented by a processor that operates on the basis of information such as a program and a computer-readable recording medium that stores information such as a program. Here, in the processor, for example, the function of each unit may be implemented by individual hardware or the function of each unit may be implemented by integrated hardware. For example, the processor may include hardware and the hardware may include at least one of a circuit that processes a digital signal and a circuit that processes an analog signal. For example, the processor may be configured using one or more circuit devices or/and one or more circuit elements mounted on a circuit board. An integrated circuit (IC) or the like may be used as the circuit device and a resistor, a capacitor, or the like may be used as the circuit element.

Here, the processor may be, for example, a CPU. However, the processor is not limited to the CPU and, for example, various types of processors such as a graphics processing unit (GPU) or a digital signal processor (DSP) may be used. Also, for example, the processor may be a hardware circuit based on an application specific integrated circuit (ASIC). Also, the processor may include, for example, a plurality of CPUs, or may include a hardware circuit of a plurality of ASICs. Also, the processor may include, for example, a combination of a plurality of CPUs and a hardware circuit including a plurality of ASICs. Also, the processor may include, for example, one or more of an amplifier circuit and a filter circuit for processing an analog signal and the like.

Although embodiments of the present invention have been described above with reference to the drawings, specific configurations are not limited to the embodiments, and design changes and the like may also be included without departing from the scope of the present invention.

What is claimed is:

1. A motor control device comprising:
an electric current detection result acquisition unit configured to acquire a result of detecting an electric current for operating a motor;
an electric current determination unit configured to determine whether or not the electric current acquired by the electric current detection result acquisition unit is greater than or equal to a predetermined threshold value;
an operation time setting unit configured to set an operation time period corresponding to the electric current on a basis of a corresponding relationship between the electric current for operating the motor and the operation time period when the electric current determination unit determines that the electric current is greater than or equal to the predetermined threshold value, the corresponding relationship being confirmed in advance and being that no problem occurs in the motor even if the electric current continuously flows through the motor for the operation time period; and an operation control unit configured to perform control for causing the motor to be continuously operated for the operation time period set by the operation time setting unit.

2. The motor control device according to claim 1, wherein the electric current determination unit makes a predetermined determination with respect to the electric current acquired by the electric current detection result acquisition unit after the control is performed by the operation control unit.

3. The motor control device according to claim 2,
wherein the electric current determination unit determines whether or not the electric current acquired by the electric current detection result acquisition unit is greater than or equal to the electric current previously acquired by the electric current detection result acquisition unit as the predetermined determination after the control is performed by the operation control unit, and
wherein the operation control unit performs control for causing an operation of the motor to be stopped when the electric current determination unit determines that the electric current acquired by the electric current detection result acquisition unit is greater than or equal to the electric current previously acquired by the electric current detection result acquisition unit.

4. The motor control device according to claim 3,
wherein the electric current determination unit determines whether or not the electric current acquired by the electric current detection result acquisition unit is greater than or equal to the predetermined threshold value when it is determined that the electric current acquired by the electric current detection result acquisition unit is less than the electric current previously acquired by the electric current detection result acquisition unit,
wherein the operation time setting unit sets the operation time period corresponding to the electric current when the electric current determination unit determines that the electric current is greater than or equal to the predetermined threshold value, and
wherein the operation control unit performs control for causing the motor to be continuously operated for the operation time period set by the operation time setting unit.

5. The motor control device according to claim 2,
wherein the electric current determination unit determines whether or not the electric current acquired by the electric current detection result acquisition unit is greater than or equal to the electric current previously acquired by the electric current detection result acquisition unit as the predetermined determination after the control is performed by the operation control unit,
wherein the operation time setting unit sets the operation time period corresponding to the electric current when the electric current determination unit determines that the electric current acquired by the electric current detection result acquisition unit is greater than or equal to the electric current previously acquired by the electric current detection result acquisition unit, and wherein the operation control unit performs control for causing the motor to be continuously operated for the operation time period set by the operation time setting unit.

6. The motor control device according to claim 1, wherein an operation of the motor is set as a predetermined normal operation when it is determined that the electric current is less than the predetermined threshold value.

7. The motor control device according to claim 1,
wherein the electric current determination unit determines whether or not the electric current acquired by the electric current detection result acquisition unit is greater than or equal to a predetermined upper limit value, and
wherein the operation control unit performs control for causing an operation of the motor to be stopped when the electric current determination unit determines that the electric current acquired by the electric current detection result acquisition unit is greater than or equal to the predetermined upper limit value.

8. The motor control device according to claim 7, wherein a value which is a margin less than an allowed maximum value of the electric current is set as the predetermined upper limit value.

9. A motor control device comprising:
an electric current detection result acquisition unit configured to acquire a result of detecting an electric current for operating a motor;
an electric current determination unit configured to determine whether or not the electric current acquired by the electric current detection result acquisition unit exceeds a predetermined threshold value;
an operation time setting unit configured to set an operation time period corresponding to the electric current on a basis of a corresponding relationship between the electric current for operating the motor and the operation time period when the electric current determination unit determines that the electric current exceeds the predetermined threshold value, the corresponding relationship being confirmed in advance and being that no problem occurs in the motor even if the electric current continuously flows through the motor for the operation time period; and
an operation control unit configured to perform control for causing the motor to be continuously operated for the operation time period set by the operation time setting unit.

10. A motor control method comprising:
acquiring, by an electric current detection result acquisition unit, a result of detecting an electric current for operating a motor;
determining, by an electric current determination unit, whether or not the electric current is greater than or equal to a predetermined threshold value;
setting, by an operation time setting unit, an operation time period corresponding to the electric current on a basis of a corresponding relationship between the electric current for operating the motor and the operation time period when it is determined that the electric current is greater than or equal to the predetermined threshold value, the corresponding relationship being confirmed in advance and being that no problem occurs in the motor even if the electric current continuously flows through the motor for the operation time period; and performing, by an operation control unit, control for causing the motor to be continuously operated for the operation time period set by the operation time setting unit.

11. A motor control method comprising:

acquiring, by an electric current detection result acquisition unit, a result of detecting an electric current for operating a motor;

determining, by an electric current determination unit, whether or not the electric current acquired by the electric current detection result acquisition unit exceeds a predetermined threshold value;

setting, by an operation time setting unit, an operation time period corresponding to the electric current on a basis of a corresponding relationship between the electric current for operating the motor and the operation time period when the electric current determination unit determines that the electric current exceeds the predetermined threshold value, the corresponding relationship being confirmed in advance and being that no problem occurs in the motor even if the electric current continuously flows through the motor for the operation time period; and performing, by an operation control unit, control for causing the motor to be continuously operated for the operation time period set by the operation time setting unit.

12. A non-transitory computer-readable storage medium that stores a program for causing a computer to implement:

a function of acquiring a result of detecting an electric current for operating a motor;

a function of determining whether or not the acquired electric current is greater than or equal to a predetermined threshold value;

a function of setting an operation time period corresponding to the electric current on a basis of a corresponding relationship between the electric current for operating the motor and the operation time period when it is determined that the electric current is greater than or equal to the predetermined threshold value, the corresponding relationship being confirmed in advance and being that no problem occurs in the motor even if the electric current continuously flows through the motor for the operation time period; and a function of performing control for causing the motor to be continuously operated for the set operation time period.

13. A non-transitory computer-readable storage medium that stores a program for causing a computer to implement:

a function of acquiring a result of detecting an electric current for operating a motor;

a function of determining whether or not the acquired electric current exceeds a predetermined threshold value;

a function of setting an operation time period corresponding to the electric current on a basis of a corresponding relationship between the electric current for operating the motor and the operation time period when it is determined that the electric current exceeds the predetermined threshold value, the corresponding relationship being confirmed in advance and being that no problem occurs in the motor even if the electric current continuously flows through the motor for the operation time period; and a function of performing control for causing the motor to be continuously operated for the set operation time period.

\* \* \* \* \*